US005452615A

United States Patent [19]
Hilton

[11] Patent Number: 5,452,615
[45] Date of Patent: Sep. 26, 1995

[54] FORCE AND TORQUE CONVERTER

[75] Inventor: John A. Hilton, Hudson, N.H.

[73] Assignee: Spacetec IMC Corporation, Lowell, Mass.

[21] Appl. No.: 95,904

[22] Filed: Jul. 22, 1993

Related U.S. Application Data

[63] Continuation-in-part of Ser. No. 52,377, Apr. 23, 1993, which is a continuation of Ser. No. 427,931, Oct. 25, 1989, Pat. No.5,222,400.

[51] Int. Cl.[6] ..................................................... G03L 3/00
[52] U.S. Cl. ........................... 73/862.043; 73/862.041; 74/471 XY
[58] Field of Search ................. 73/862.041, 862.042, 73/862.043, 862.05; 74/471 XY; 250/211

[56] References Cited

U.S. PATENT DOCUMENTS

| | | | |
|---|---|---|---|
| 3,561,263 | 2/1971 | Ward et al. | 72/862.043 |
| 3,628,394 | 12/1971 | Keatinge et al. | 74/471 XY |
| 3,640,130 | 2/1972 | Spescha et al. | 73/862.043 |
| 3,693,425 | 9/1972 | Starita et al. | 73/862.044 |
| 3,921,445 | 11/1975 | Hill et al. | 73/862.043 |
| 4,178,799 | 12/1979 | Schmieder et al. | 73/862.045 |
| 4,488,441 | 12/1984 | Ramming | 73/862.044 |
| 4,550,617 | 11/1985 | Fraignier et al. | 73/862.042 |
| 4,573,362 | 3/1986 | Amlani | 73/862.045 |
| 4,589,810 | 5/1986 | Heindl et al. | 414/5 |
| 4,607,159 | 8/1986 | Goodson et al. | 74/471 XY |
| 4,680,465 | 7/1987 | Stevens et al. | 250/221 X |
| 4,782,327 | 11/1988 | Kley et al. | 250/221 X |

FOREIGN PATENT DOCUMENTS

| | | |
|---|---|---|
| 0176173 | 4/1986 | European Pat. Off. . |
| 957980 | 2/1957 | Germany . |
| 2926213 | 6/1979 | Germany . |
| 209519 | 9/1982 | Germany . |
| 3420884 | 6/1984 | Germany . |
| 218458 | 2/1985 | Germany . |
| 224930 | 7/1985 | Germany . |
| 95331 | 5/1985 | Japan . |
| 974155 | 5/1981 | U.S.S.R. . |
| 2096777 | 10/1982 | United Kingdom . |

OTHER PUBLICATIONS

International Search Report Dated Oct. 27, 1994 citing U.S. Pat. No. 4,607,159 [Goodson et al.].

Primary Examiner—Richard E. Chilcot, Jr.
Assistant Examiner—Elizabeth L. Dougherty
Attorney, Agent, or Firm—Wolf, Greenfield & Sacks

[57] ABSTRACT

A force and torque converter is provided that senses force and torque applied to the device. The converter includes a base, a grip, resilient connection members that extend radially and coplanarly from a central hub, located within the grip, and that connect to the grip, and sensing mechanisms to sense the displacement of the connection members. The displacements are resolved to determine the force and torque that is applied to the device, with respect to a Cartesian coordinate system.

20 Claims, 7 Drawing Sheets

FORCE AND TORQUE CONVERTER

CROSS REFERENCE TO RELATED APPLICATIONS

The present application is a Continuation in Part of an application for patent filed Apr. 23, 1993, Ser. No. 08/052,377, which is a Continuation of Ser. No. 07/427,931 filed Oct. 25, 1989, now U.S. Pat. No. 5,222,400 issued Jun. 29, 1993.

FIELD OF THE INVENTION

The present invention relates to a force and torque converter that is useful in a wide field of activities, particularly those in which a manual motion is to be converted into an electronic representation for use as a control signal.

BACKGROUND TO THE INVENTION

There is a need for a sensing system to monitor manually applied forces and torques. An example of such a sensor system is described in U.S. Pat. No. 3,921,445 to Hill and Sword. In that specification, the manipulator is of a hand-like form comprising a pair of jaws, which are relatively pivotally movable under operation of an electric motor. The manipulator includes a wrist. Sensing means are provided for sensing the magnitude and direction of applied forces and torques. The applied force is decomposed into components corresponding to three mutually orthogonal axes intersecting at the wrist. The sensing means include a series of sensors extending around the longitudinal axis of the manipulator.

U.S. Pat. No. 4,811,608 to Hilton, entitled FORCE AND TORQUE CONVERTER, issued Mar. 14, 1989, utilizes an architecture in which six connection members extend radially from a central mounting block to a grip. Each connection member extends along one of three mutually orthogonal axes. Sensing mechanisms are disposed to detect the displacement of the connection members and thereby determine the applied force and/or torque.

U.S. Pat. No. 4,550,617 to Fraignier et al., entitled MULTI AXIS FORCE AND MOMENTS TRANSDUCER, issued Nov. 5, 1985, utilizes an architecture in which two bodies are connected by a plurality of flexible plates, subdivided into pairs. Each pair is arranged to have one plate being orthogonal to the other. Strain gauges detect the flexing of each plate.

The prior art force and torque converters are expensive and for a wide variety of applications actually are prohibitively expensive. Thus, a lower cost but still highly reliable torque and force converter is needed in the marketplace.

SUMMARY OF THE INVENTION

The shortcomings of the prior art are overcome and other objects are accomplished with a force and torque converter, which utilizes a simplified architecture to sense the force and/or torque applied to the device.

In one embodiment of the invention, the apparatus includes a grip, which is preferably comfortable to hold and intuitive to maneuver, e.g., a ball shape. Three connection members moveably engage the grip and fixedly connect to a central hub. The central hub is, in turn, connected to a support, which extends through and outside the grip, for mounting to a base, allowing the apparatus to stand freely.

The connection members are resilient in two planes. If a force or torque is applied to the grip, one or more of the connection members are displaced to a limited extent. The displacement is directly related to the resiliency of the connection members (i.e., their spring constants) and to the applied force. The connection members are disposed to facilitate construction and minimize cost. As such, in one embodiment, three connection members are arranged to extend radially and coplanarly from the central hub, approximately 120° apart from adjacent connection members.

Photo-optical sensing mechanisms detect the displacement of each connection member along directions that are orthogonal relative to the longitudinal (i.e., radial) direction of the connection member. The photo-optical sensing mechanisms can use various arrangements of disposition and components.

Among the embodiments specifically illustrated the photo-optical sensing mechanism for a given connection member employs two optical sources, such as light emitting diodes (LEDs). One embodiment uses six LEDs, two per connection member, one to detect each orthogonal displacement as described above, and six photo-diodes to optically communicate with the LEDs in LED/photo-diode pairs. In another embodiment, only three photo-diodes are used. In this embodiment, reflective members reflect the optical energy from two light emitting diodes on to one photo-diode. By time-multiplexing the energizing of the two LEDs, the output of the photo-diode can be associated with each LED, in turn. In yet another embodiment, only one photo-diode is used for the whole apparatus. In this embodiment, the masked optical energy is communicated to the photo-diode by light pipes or optical glass fibers, and time-division multiplexing is used to energize each LED in sequence and to distinguish the photo-diode's output in response to each source. In each case, the photo-diode's output varies directly with the displacement of the associated connection member along a particular direction.

The applied force and/or torque is determined from the combination of the detected displacements, i.e., the detected optical energy, in conjunction with the known geometry of the device. In the three connection member embodiment described above, the applied force and torque can be resolved into Cartesian components, or other suitable coordinate systems.

Photo-sensing provides high reliability and low cost in comparison to other sensing mechanisms, such as strain gauges. The use of photo-sensing mechanisms can reduce the cost of the overall architecture as metal flexures and their supports are not needed like they are with strain gauges. In addition, potentially fewer components are needed, thereby easing manufacture.

In another embodiment, signal processing mechanisms are included for processing the signals generated by the sensors. Users generally prefer to apply different strength forces to a device. Small forces and torques are generally applied when a precise response is desired. Larger forces and torques are generally applied when a faster but less precise response is desired. The signal processing mechanisms implement the desirable sensitivity characteristics. The apparatus thereby provides precise response for relatively small applied forces and fast response for relatively large applied forces. In addition, the signal processing mechanism can resolve the photo-diode's output into Cartesian (or other) components.

The invention further comprises a novel photo-optical analog-to-digital converter circuit which inexpensively resolves the movement of the hand grip of the force and torque converter.

BRIEF DESCRIPTION OF THE DRAWINGS

The invention will become more apparent from the following detailed specification and drawing in which.

DETAILED DESCRIPTION OF THE INVENTION

Figure 1:
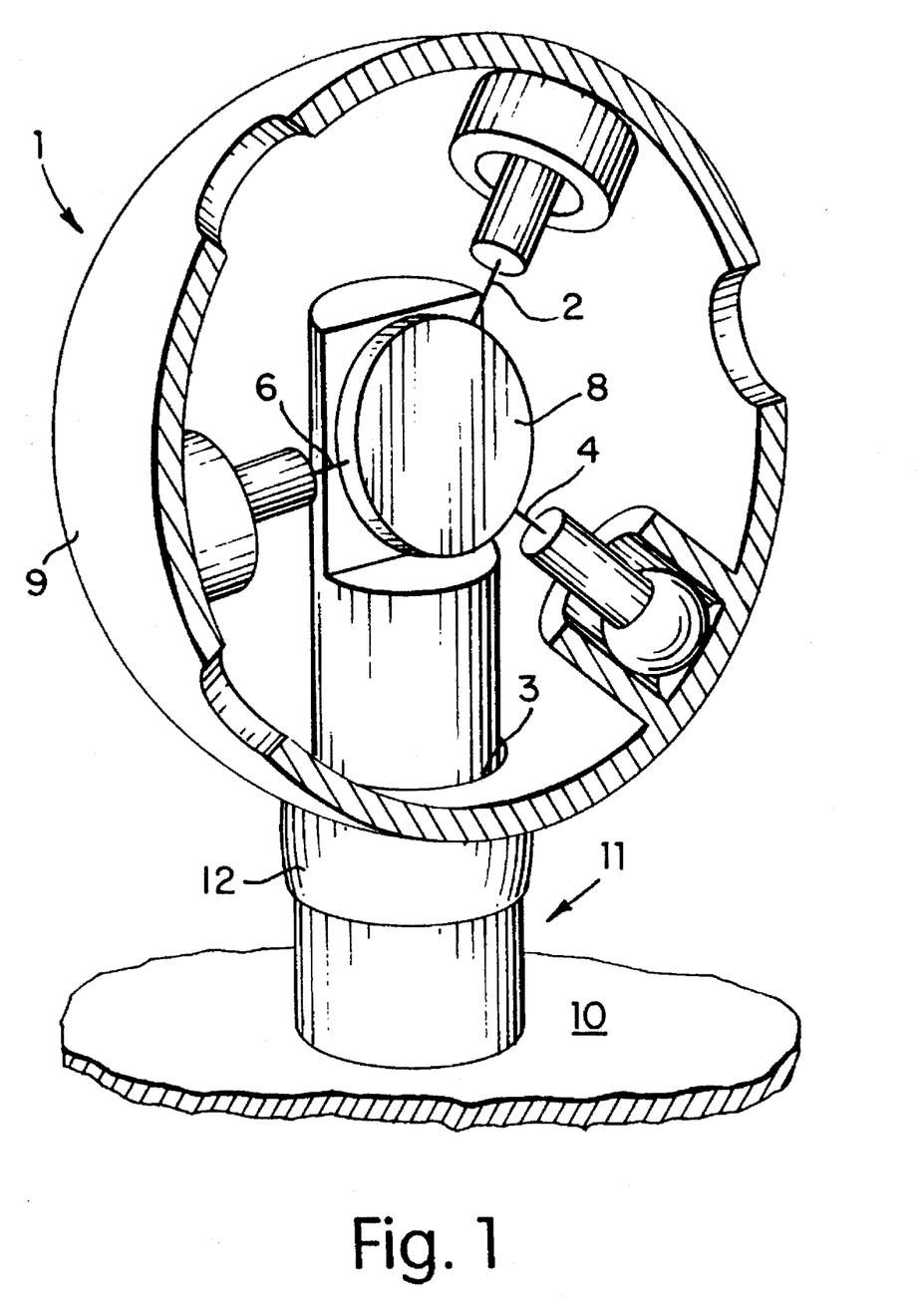
FIG. 1 is a simplified perspective view of the apparatus with a section of the grip cut away to expose the interior, omitting the photo-optical sensing mechanisms.

FIG. 1 is a perspective view of the force and torque converter 1 with a portion of the grip 9 cut away. Connection members 2, 4, and 6 extend radially and coplanarly from central hub 8. The connection members extend approximately 120° apart from adjacent connection members. Hub 8 is connected to support 11, which extends through an aperture 3 in grip 9 and is connected to base 10. The aperture 3 must be slightly larger than support 11 to allow the grip 9 to be displaced. A flexible sleeve 12 of, for example, rubber or neoprene or the like, may be used to cover support 11 exterior to grip 9, largely for aesthetic purposes. To avoid obfuscation, photo-sensing mechanisms are not shown in this figure.

Figure 2:
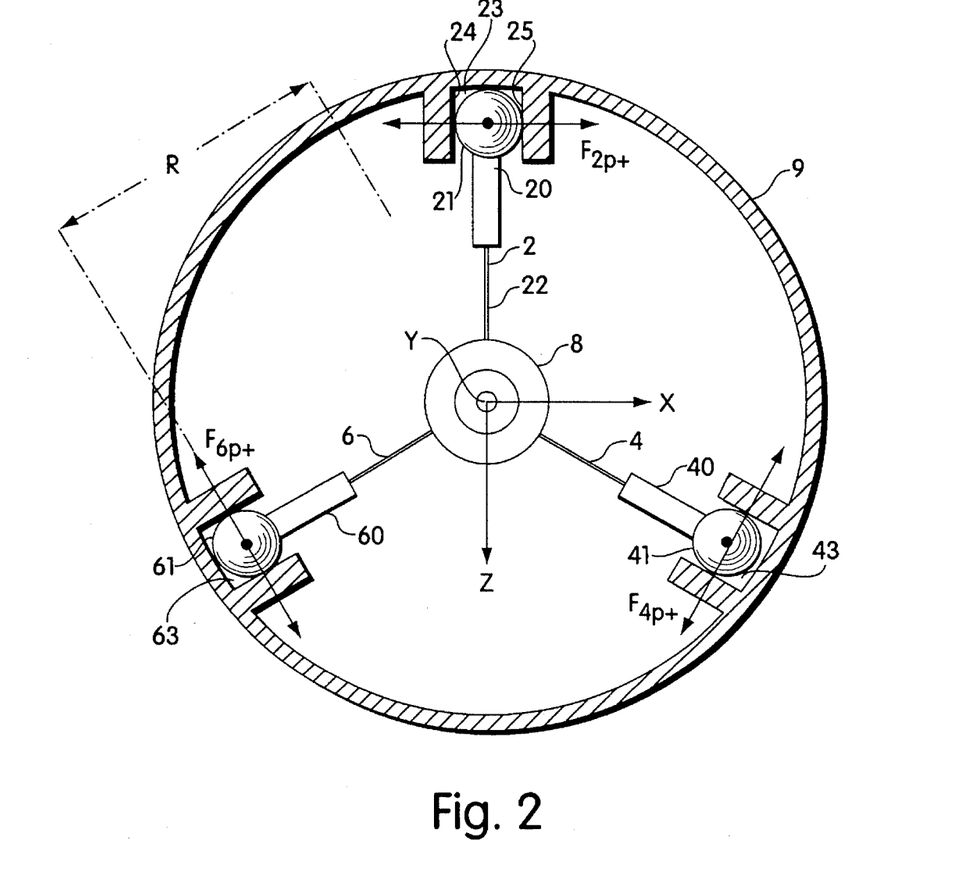
FIG. 2 is a schematic view of the central hub, connection members, and grip as used in one embodiment of the invention, omitting the photo-optical sensing mechanism.
Figure 3:
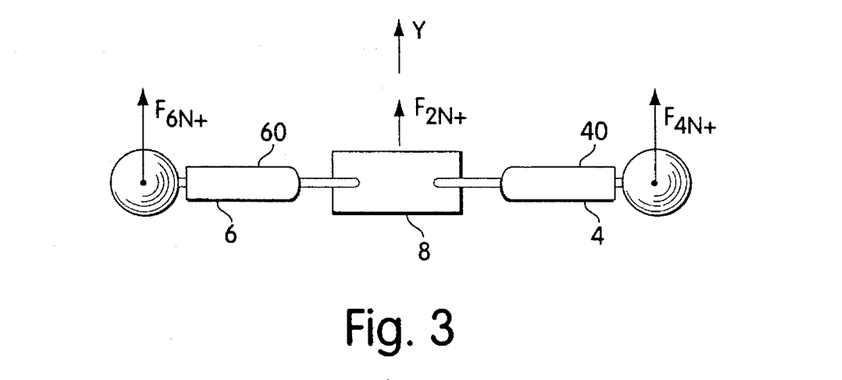
FIG. 3 is a view of the central hub of FIG. 2 with connection members extending therefrom, taken normal and looking in to the Z-axis of FIG. 2.

FIG. 2 illustrates the central hub and connection members 2, 4, and 6 as used in one embodiment of the invention. FIG. 2 illustrates the X and Z axes of a right handed Cartesian coordinate system. The Y axis extends normal to the page. FIG. 3 illustrates the hub 8 and connection members 4 and 6 as viewed looking along the Z axis. Of course, other coordinate systems can be employed.

Referring to FIG. 2, each connection member 2, 4, and 6 has three distinct sections. Referring to connection member 2, there is a photo-masking section 20, a connection section 22, and a ball section 21. The connection section 22 must be resilient so that the entire connection member can become displaced in response to an appropriate force and torque. Each ball section 21, 41, and 61 engages (in line contact) a corresponding cylindrical hole 23, 43, and 63, respectively, formed in the inner surface of grip 9. The surface of the ball section, e.g., 21, is curved to give point contact with the surfaces 24 and 25 forming slot 23, thereby minimizing friction between the connection member 2 and grip 9.

As will be further described below, photo-optical sensing mechanisms are disposed to detect any displacement of connection members 2, 4, 6 along planar and normal directions, relative to the longitudinal direction of the connection members. FIG. 2 illustrates the co-planar orientations of the connection members at rest, with arrows $F_{2p}$, $F_{4p}$, and $F_{6p}$ indicating the forces in the X-Z plane between the connection members and the slots. FIG. 3 illustrates the forces between the connection member and the slots, at arrows $F_{2N}$, $F_{4N}$, and $F_{6N}$, respectively, in the Y-direction.

The invention will be described in an embodiment that utilizes connection members of equal length R, as shown in FIG. 2, but it will be understood that the connection members need not necessarily be of equal lengths.

The connection members preferably all have the same resiliency (i.e., spring constant). The resilient connection members are displaced in direct relation to the applied force and/or torque. It can be easily demonstrated that given the geometry described above, the forces (Fx, Fy and Fz) along, and the torques (Tx, Ty and Tz) about the respective Cartesian axes can be resolved by the following equations:

$$F_x = F_{2p} - \tfrac{1}{2}(F_{4p} + F_{6p})$$

$$T_x = R(F_{2N} - \tfrac{1}{2}(F_{4N} + F_{6N}))$$

$$F_y = F_{2N} + F_{4N} + F_{6N}$$

$$T_y = -R(F_{2p} + F_{4p} + F_{6p})$$

$$F_z = (\tfrac{3}{4})^{1/2}(F_{4p} - F_{6p})$$

$$T_z = R(\tfrac{3}{4})^{1/2}(F_{4N} - F_{6N})$$

Photo-optical sensing mechanisms are displaced about each connection member in order to detect both the planar and the normal displacements. In this fashion, both the planar and the normal forces can be determined and forces and torques can be resolved in Cartesian space.

Figure 4:
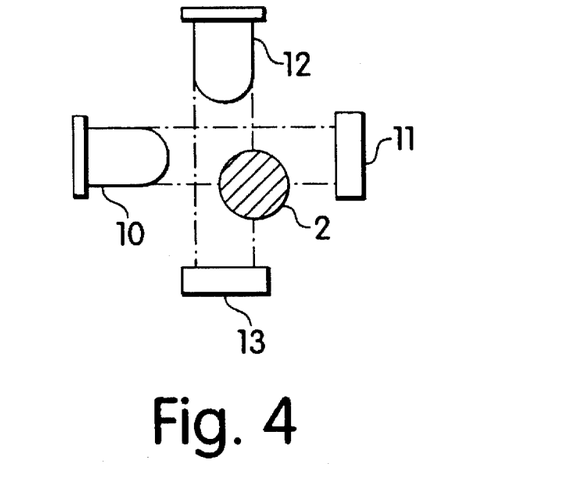
FIG. 4 is a diagrammatic illustration of an embodiment of a photosensing mechanism for detecting the displacement of a connection member.

One embodiment of the device utilizes a photo-optical sensing arrangement as illustrated in FIG. 4. It is understood that this arrangement is repeated for each connection member. In FIG. 4, the cross-section of connection member 2 is shown, with the member in an initial, at rest position. LED 10 optically communicates with photo-diode 11, and LED 12 optically communicates with photo-diode 13. The at rest position is such that each optical communication pathway is partially masked by the connection member. Consequently, any displacement of connection member 2 that is orthogonal to the longitudinal direction of the connection member 2 will be detected by one or both of the photo-diodes sensing either more or less optical energy. It will be appreciated that with conventional signal processing such an arrangement detects displacement along the planar and normal directions referred to in FIGS. 2 and 3 (i.e., $F_{2p}, F_{4p}, F_{6p}$ and $F_{2N}, F_{4N}, F_{6N}$). It will be further appreciated that, if grip 9 was displaced along a line that is parallel to the longitudinal (i.e., radial) direction of a connection member, the other two connection members, with their respective photo-optical sensing, would sense this displacement.

Referring to FIGS. 2 and 3 together, operation of the device and detection of torque and force is described as follows: If a force is applied along the Z-axis, connection members 4 and 6 will be deflected in the X-Z plane. Any movement by connection member 2 will not be detected by the optical sensing mechanisms for connection member 2, but will be detected as a positive deflection by connection member 4 and a negative deflection by connection member 6. If a force is applied along the X-axis, connection member 2 will be detected as a positive force along lines $F_{2p+}$. Connection members 4 and 6 will be detected as negative displacements, i.e., as deflections toward $F_{4p-}$ and $F_{6p-}$, respectively. A torque about the Y-axis is detected as negative deflections along $F_{2p}$, $F_{4p}$ and $F_{6p}$. Referring to FIG. 2 and 3 together, a torque about the X-axis is seen as a positive deflection along $F_{2N}$ and negative deflections along $F_{4N}$ and $F_{6N}$. The remaining torques and forces are easily understood by analogy to the description above.

Though FIG. 4 illustrates the LED/photo-diode pairs as disposed orthogonally to each other, it will be understood that each pair can be disposed in numerous other manners, so long as their optical communication pathways are non-parallel. In such an alternative non-orthogonal arrangement, the results from the detection would need to be decomposed into their orthogonal (or other suitable) components. Such arrangements may be used to facilitate manufacture, if necessary.

In one embodiment, LED/photo-diode pair 10, 11 and LED/photo-diode pair 12, 13 optically communicate in a switched manner (i.e., time-division multiplexing); preferably, this approach is used with the configuration of FIG. 4, also, to avoid optical cross-talk. The sampling rate will be determined by the context in which the apparatus is used. For example, if the apparatus is used as an input device to a computer system, the sampling rate must be sufficient for use in relation to the refresh rate of the computer screen. Time-division multiplexing saves power by energizing the photo-sensing components only when necessary. In an alternative embodiment, frequency-division multiplexing can be used in which, for example, one LED uses one optical frequency and the second LED uses a second optical frequency. These embodiments de-sensitize each photo-diode to the incidental effects of the photomasking section reflecting light from unintended optical sources, i.e., the "wrong" LED.

Figure 5:
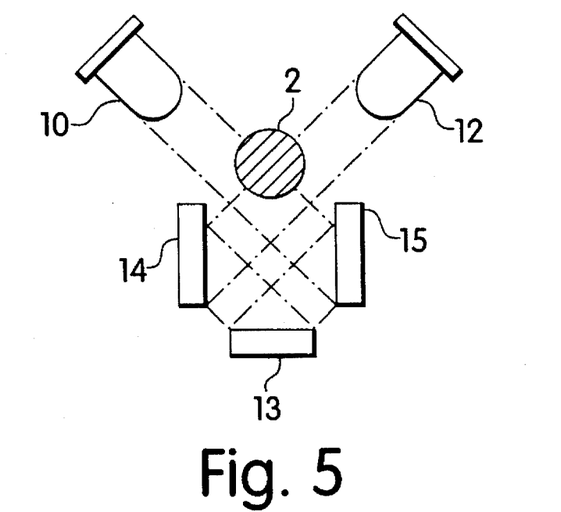
FIG. 5 is a diagrammatic illustration of another embodiment of a photosensing mechanism for detecting displacement of a connection member.

Referring to FIG. 5, another embodiment is shown in which LEDs 10 and 12, again, are orthogonal with respect to each other's optical communication path. However, in this arrangement, reflective members 14 and 15 are disposed to reflect the optical energy of their respective LEDs onto a single photo-diode 13. As readily seen, this arrangement needs only one photo-diode and thereby saves the cost of a photo-diode at the lesser expense of reflective members 14 and 15. Again, LEDs 10 and 12 preferably operate in a multiplexed manner. In this embodiment, the signal processing section or driver that receives the output from the photo diode 13 must maintain state information indicating which LED is being sampled at the given instant.

Figure 7:
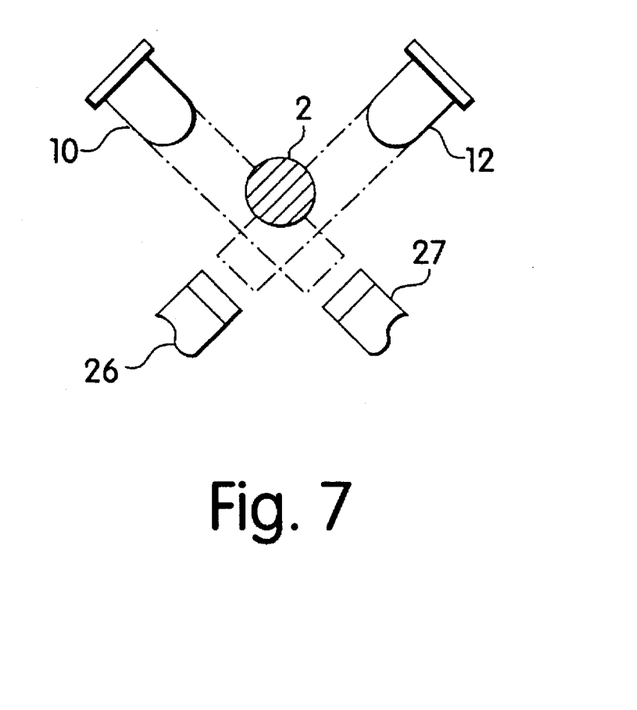
FIG. 7 is a diagrammatic illustration of yet another embodiment of a photosensing mechanism using light pipes for detecting displacement of a connection member.
Figure 8:
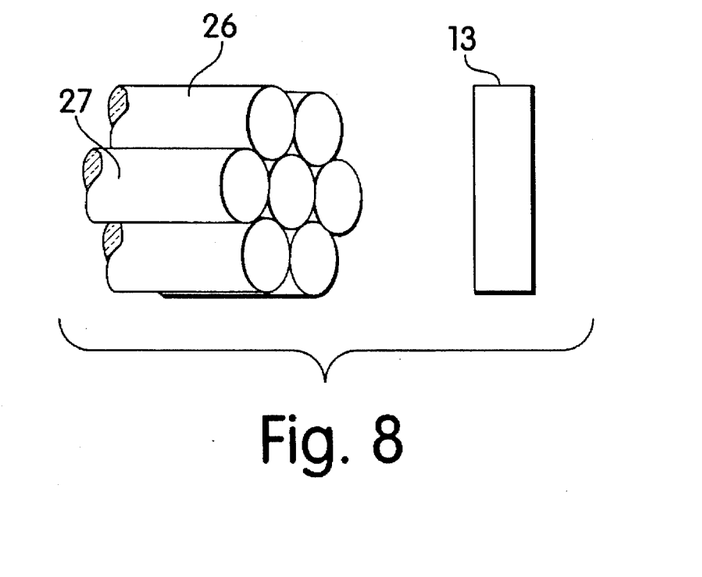
FIG. 8 is a diagrammatic illustration of yet another embodiment of a photosensing mechanism using light pipes for detecting displacement of a connection member.

Moreover, alternative embodiments can be employed in which all of the LEDs for the complete converter share only one photo-diode by using an appropriate switching rate and by utilizing light pipes or optical glass fibers to direct the masked optical energy onto the photo-diode. Referring to FIG. 7, an embodiment is shown that uses light pipes 26 and 27 to optically communicate with LED 10 and 12. In like fashion, light pipes 26 and 27 can be replaced by a single light pipe and by using reflective members similar to those described with reference to FIG. 5. FIG. 8 illustrates light pipes 26 and 27 in a final plumbing arrangement in which they are formed with other light pipes sourced from other LEDs. Photo diode 13 optically communicates with the arrangement. Similarly to that described above with reference to FIG. 5, state information must be maintained indicating which LED is communicating with the photo diode 13 at a given instant. In addition, light pipes may be used to share the LEDs, as well.

The desirable characteristics for sensing the displacement of the connection members 2, 4, and 6 are non-contact sensing to eliminate friction, the coupling of general planar displacement into responsive and non-responsive displacements, large sensed dynamic range, immunity to external influences, small size, high reliability, and low cost. (Sensed dynamic range is defined as the ratio as the largest sensed displacement to the smallest sensed displacement). The photo-optical sensing arrangement described above with reference to FIGS. 4, 5, 7, and 8 have such characteristics.

Numerous forms of resilient mechanisms, employing various materials in various physical structures, are possible. The resilient mechanisms employed in the above-described embodiments exhibit a set of characteristics important to the operation of the device, including negligible material hysteresis, negligible friction, and high reliability.

Pushing the grip 9 to the limit in one direction and releasing will result in a specific position. Pushing to the limit in the opposite direction and releasing will result in a slightly different position. The difference between these two positions defines the physical hysteresis along the tested direction. The embodiments described above exhibit negligible physical hysteresis because the connection members 2, 4, and 6 are designed to have minimal friction with grip 9. (Friction in any form introduces hysteresis into the design, since friction dissipates energy.)

Figure 6:
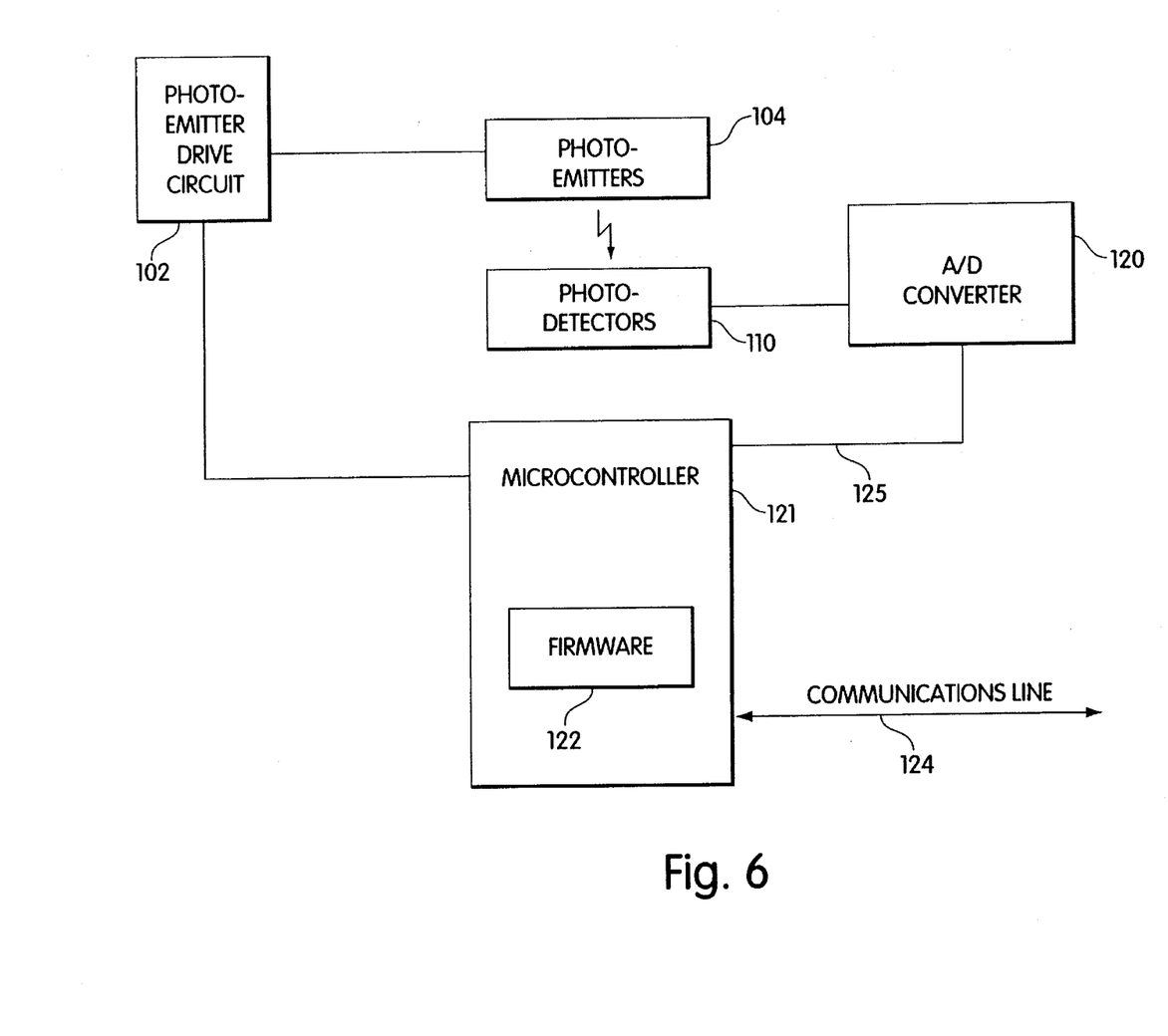
FIG. 6 is a logic block diagram of a signal processing section for use with the invention of FIGS. 1–5.

FIG. 6 is a logic-block diagram of a signal processing mechanism, which can be utilized in one embodiment of the invention. A photo-emitter drive circuit 102 drives a set of photo-emitters (e.g., LED's) 104. Analog output from the associated sensors, e.g., photodetectors 110, is converted to a digital value by an A/D converter 120 controlled by a microprocessor or microcontroller 121 and firmware 122. The microcontroller derives the force and torque values from the raw digitized displacement values from the A/D converter and transmits the force and torque values, via a communications line 124, to the system which uses the force and torque converter. The A/D conversion rate desirably matches or exceeds human response rates for suitable operation. Conversion rates of the order of 100 sets per second are suitable. It will be apparent to those skilled in the art that other conversion techniques can be employed. In one embodiment of the invention the A/D circuit 120, microprocessor 121 and firmware 122 are placed in the interior space of grip 9. In another embodiment, however, the circuit, microprocessor and firmware are external to the grip 9.

It is desirable to obtain a sensitivity range at least as large as the comfortable operational range of the human hand. The largest detectable effort is determined by the effort required to achieve the largest detectable displacement. The smallest detectable effort is determined by summing the errors due to the hysteresis of the device, the environmental effects on the sensors (temperature, humidity, aging, etc.) and the accuracy and stability of the sensing electronics while taking account of any compensation made by the control algorithm to minimize any error inducing characteristic.

Figure 10:
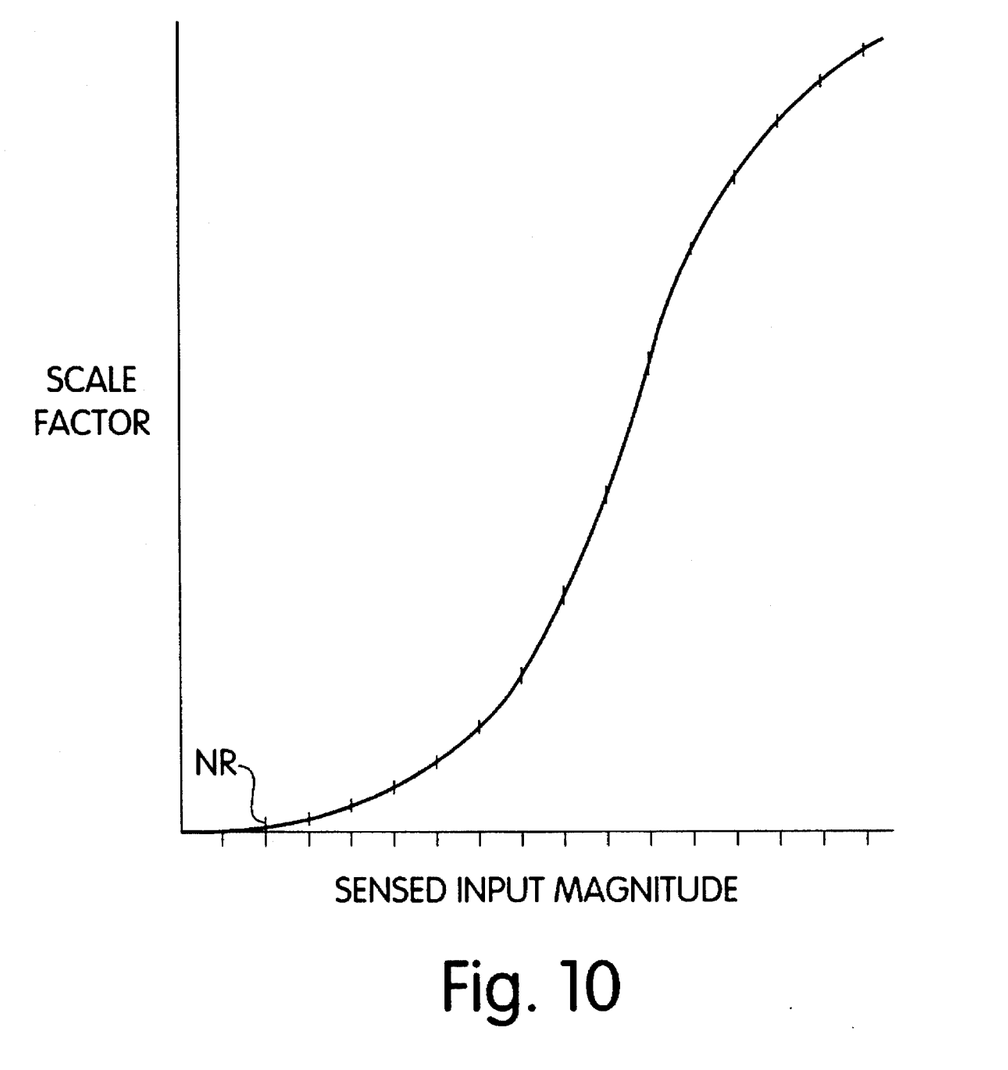
FIG. 10 illustrates an example of a sensitivity curve.

In one embodiment of the invention, a sensitivity curve (see e.g. FIG. 10) for the apparatus is implemented as a table look up function within the microprocessor 121 and firmware 122. In this fashion, greater flexibility is achieved, permitting a user to customize the operation of the input device to suit his/her particular tastes. Thus, this embodiment receives signals on lines 125 from A/D converter 120 and creates a representative output transmitted on line 124 (see FIG. 6) with the desirable sensitivity characteristics.

In one embodiment, a null region value is stored in the table within the firmware. The null region value defines the minimum sensed value which will result in a non-zero output. Any input of magnitude less than the null region (see e.g., NR FIG. 10) is automatically zeroed. This prevents such effects as unwanted drifting from occurring due to hysteresis and other errors inherent in the device.

Figure 9:
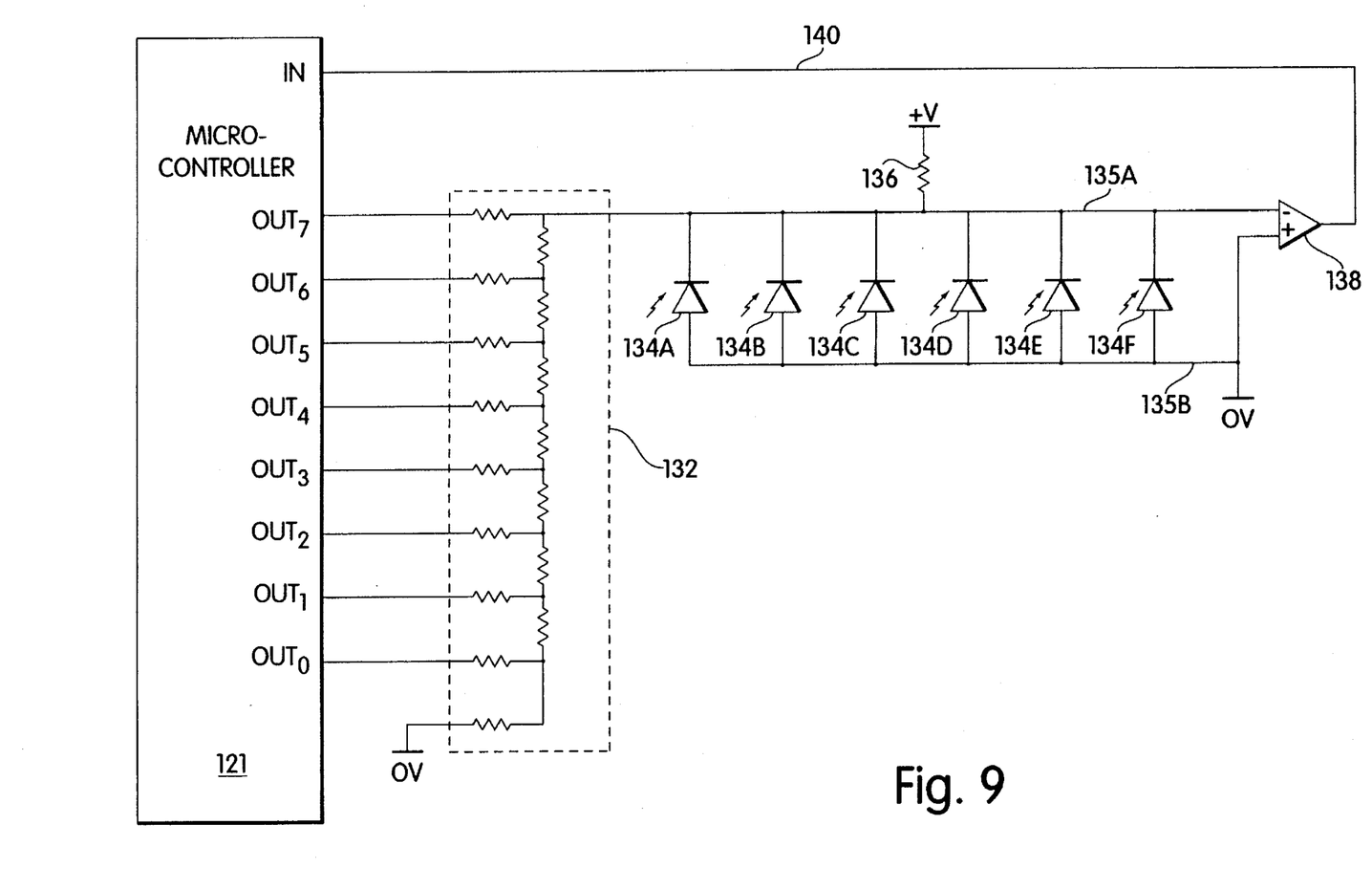
FIG. 9 is a schematic circuit diagram of an analog-to-digital converter which is particularly useful with the photosensing mechanism described herein.

A second, particularly well-suited, A/D converter circuit is shown in FIG. 9. In this illustration, an 8 bit-resolution converter is shown, although other resolutions, of course, can be implemented with an appropriate R-2R ladder network.

This A/D converter is formed of an R-2R ladder network 132, six photodiodes 134A–134F (one for each degree of freedom), an offset-compensating resistor 136 and a comparator 138. The output signal from comparator 138 on line 140 (to the microprocessor's data input) specifies whether the voltage on line 135A is above or below the voltage on line 135B. Line 135 B is held at a voltage of 0 volts by its direct connection to the 0 V line. Line 135A's voltage is determined by the bit pattern applied by the microprocessor to the R-2R ladder network 132 and the amount of current pulled from line 135A to line 135B by the photodiodes. By only illuminating one photodiode at a time, readings can be taken of each photodiode in turn. The illuminated photodiode will pull line 135A more and more negative, which increases the current drawn from the R-2R ladder network until a balance is reached. As the digital value of the bit pattern from microprocessor 121, on outputs $OUT_0$–$OUT_7$, increases, the R-2R ladder network will pull line 135A more and more positive for a given current.

Using a technique called successive approximation, a search is made of digital values to identify a value where the voltage on line 135A is above or equal to 0 volts but where the next lower value results in the voltage on line 135A being below 0 V. At this value, the current supplied by the R-2R ladder network is proportional to the digital value and the current pulled by the illuminated photodiode is proportional to the amount of illumination. Therefore, the digital value is proportional to the amount of illumination.

The non-illuminated photodiodes are not in total darkness and therefore draw a very small and fairly constant current. To offset this effect an offset-compensating resistor 136 is employed as shown. Errors in operation due to current in and out of the inverting comparator input and also due to only near-ideal voltages provided by the microprocessor to the R-2R ladder network are negligible.

The converter of FIG. 9 is particularly easy to fabricate and inexpensive, requiring only one comparator the offset-compensating resistor and an R-2R ladder network.

Having thus described several particular embodiments of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended to be limiting. The invention is limited only as defined in the following claims and equivalents thereto.

What is claimed is:

1. An apparatus for providing an electronic representation in response to force being applied along and torque being applied about any of up to three mutually orthogonal axes originating in said apparatus, the apparatus comprising:

a support member;

a grip for receiving said applied force and torque;

three connection members fixed to and radially extending from said support member and engaging said grip, said connection members having a resiliency such that the grip is displaceable to a limited extent in response to the application of said applied force and torque; and optical sensing means for detecting displacement of each of the connection members and for providing said electronic representation, the electronic representation being representative of the applied force and the applied torque.

2. The apparatus of claim 1 wherein the optical sensing means includes, for each connection member, a first and a second photo-emitter and photo-detector pair, the photo-emitter of each said pair being arranged to be in optical communication with the photo-detector of said pair such that the corresponding connection member, in response to applied force or torque, masks a portion of the optical energy being communicated between the photo-emitter and photo-detector of at least one pair.

3. The apparatus of claim 2 wherein the optical sensing means includes means for energizing the photo-emitters of the first and second pair in a time-division multiplexed manner.

4. The apparatus of claim 1 wherein the optical sensing means includes a first and a second photo-emitter and includes, for each connection member, first and second reflective members for receiving and reflecting optical energy from a corresponding photo-emitter, the first and second photo-emitter and corresponding first and second reflective members being arranged about a corresponding connection member such that the corresponding connection member masks a portion of the optical energy being communicated by the first and second optical-emitters, when an applied force or torque displaces the connection members, the optical sensing means further including a single photo-detector for each connection member, the single photo-detector being arranged to receive reflected optical energy from both the first and the second reflective members.

5. The apparatus of claim 4 wherein the optical sensing means includes means for energizing the first and second photo-emitters in a time-division multiplexed manner.

6. The apparatus of claim 1 wherein the optical sensing means includes, for each connection member, a first and a second photo-emitter respectively arranged in optical communication with a first and a second light pipe, and includes a corresponding connection member disposed relative to the photo-emitters and light pipes so as to mask a portion of the optical energy being communicated by the first and/or second photo-emitter, when a force and/or torque displaces the connection members, the optical sensing means further including a single photo-detector arranged in optical communication with both The first and second light pipes.

7. The apparatus of claim 6 wherein the optical sensing means further includes means for energizing the first and second photo-emitter for each connection member in a time-division multiplexed manner.

8. An apparatus for providing an electronic representation in response to force being applied along and torque being applied about any of up to three mutually orthogonal axes originating in said apparatus, the apparatus comprising:

a support member;

a grip for receiving said applied force and torque;

three connection members fixed to and radially extending from said support member and engaging said grip, said three connection members having a resiliency such that the grip is displaceable in response to the application of an applied force and/or torque;

optical sensing means for detecting displacement of each of the three connection members and for providing an output, representative of said displacement; and a microcontroller, receiving the output from the optical sensing means and providing the electronic representation therefrom in accordance with a predetermined sensitivity curve, the electronic representation being representative of the applied force and the applied torque.

9. The apparatus of claim 1, wherein the first end of each connection member is fixed to the support member and a second end of the connection member engages the grip.

10. The apparatus of claim 9, wherein the second end of each connection member includes a ball section that engages a corresponding cylindrical hole.

11. The apparatus of claim 1, wherein there are three connection members only and the three connection members extend radially and coplanarly from the support member.

12. An apparatus for converting an applied force and/or torque into an electronic representation indicative of the applied force and/or torque, comprising:

a support member;

a grip for receiving the applied force and/or torque;

three connection members only, the connection members fixed to and radially and coplanarly extending from the support member, each said connection member engaging the grip at a distal end and each connection member having a resiliency such that, when the force and/or torque is applied to the grip, the grip is displaced in monotonic relation to the applied force and/or torque;

optical sensing means, arranged about each connection member, for detecting the displacement of each of the three connection members and for providing an electronic signal indicative of the displacement; and a control circuit including an A/D converter that receives the electronic signal and provides a digital representation thereof and including a microcontroller that receives the digital representation and has means for providing the electronic representation indicative of the applied force and the applied torque according to a predetermined sensitivity curve.

13. An apparatus for providing an electronic representation in response to force being applied along and torque being applied about any of up to three mutually orthogonal axes originating in said apparatus, the apparatus comprising:

a support member;

a grip for receiving said applied force and torque;

three connection members fixed to and radially extending from said support member and engaging said grip, said connection members having a resiliency such that the grip is displaceable to a limited extent in response to the application of an applied force and/or torque; and a photo-emitter and photo-detector network arranged within the grip to detect the displacement of any of the connection members and to provide the electronic representation therefrom the electronic representation being representative of the applied force and the applied torque.

14. An apparatus for providing an electronic representation in response to force being applied along and torque being applied about any of up to three mutually orthogonal axes originating in the apparatus, the apparatus comprising:

a support member having a connection end and a base end;

a grip for receiving the applied force and the applied torque, the grip being adjacent the connection end of the support member;

a plurality of connection members, each connection member having a first end connected to the connection end of the support member, and a second end that engages the grip, each connection member radially extending from the connection end of the support member towards the grip; and optical sensing means for measuring displacement of each of the connection members, and for providing the electronic representation representative of the applied force and the applied torque.

15. The apparatus of claim 14, wherein the optical sensing means is disposed within the grip.

16. The apparatus of claim 15, wherein the optical sensing means includes a light source and a light receiver, both the light source and the light receiver being disposed externally from the support member.

17. The apparatus of claim 16, further including circuitry that filters out electronic representations representative of at least one of the applied force and the applied torque less than a predetermined threshold.

18. The apparatus of claim 14, wherein the optical sensing means includes a light source and a light receiver, both the light source and the light receiver being disposed externally from the support member.

19. The apparatus of claim 18, further including circuitry that filters out electronic representations representative of at least one of the applied force and the applied torque less than a predetermined threshold.

20. The apparatus of claim 14, further including circuitry that filters out electronic representations representative of at least one of the applied force and the applied torque less than a predetermined threshold.

* * * * *